United States Patent [19]

Hrycak

[11] Patent Number: 4,983,977
[45] Date of Patent: Jan. 8, 1991

[54] ARCHITECTURE FOR MONOPULSE ACTIVE APERTURE ARRAYS

[75] Inventor: Peter D. Hrycak, Millersville, Md.

[73] Assignee: Westinghouse Electric Corp., Pittsburgh, Pa.

[21] Appl. No.: 481,039

[22] Filed: Feb. 16, 1990

[51] Int. Cl.⁵ .............................................. G01S 13/44
[52] U.S. Cl. .................................... 342/153; 342/149
[58] Field of Search ............................ 342/153, 149

[56] References Cited

U.S. PATENT DOCUMENTS

| | | | |
|---|---|---|---|
| 3,064,253 | 11/1962 | Kirkpatrick | 342/149 |
| 3,064,254 | 11/1962 | Dickey, Jr. | 342/149 X |
| 3,618,092 | 11/1971 | Waineo | 342/149 |
| 3,618,093 | 11/1971 | Dickey, Jr. | 342/149 |
| 3,720,941 | 3/1973 | Ares | 342/149 X |
| 4,064,510 | 12/1977 | Chabah | 342/152 X |
| 4,220,953 | 9/1980 | Carre | 342/149 X |
| 4,568,940 | 2/1986 | Diamond | 342/149 |
| 4,591,862 | 5/1986 | Parkhurst | 342/152 X |
| 4,638,319 | 1/1987 | Chua | 342/147 X |
| 4,789,861 | 12/1988 | Baggett et al. | 342/152 |

*Primary Examiner*—Gilberto Barrón, Jr.
*Attorney, Agent, or Firm*—W. G. Sutcliff

[57] ABSTRACT

An architecture for a monopulse, active aperture array is provided which functions as a high precision error compensation system correcting both the Sum and the Difference beams simultaneously. The architecture incorporates; a radiating antenna, a transmit-receiver, a −3.01 dB Wilkinson divider operable to split the signal received from the transmit-receiver, a Sum plus Difference network, a Sum minus Difference network both of which accept the split signal from the −3.01 dB Wilkinson divider and simultaneously error compensate the beams, and a four port magic tee operable to output the error compensated signals from the Sum plus Difference network and the Sum minus Difference network.

1 Claim, 2 Drawing Sheets

ARCHITECTURE FOR MONOPULSE ACTIVE APERTURE ARRAYS

BACKGROUND OF THE INVENTION

1. Field of the Invention

The present invention relates to an improved architecture for monopulse active aperture arrays; specifically, where a single set of adjustments in the radar system transmit-receive module can simultaneously compensate for errors in both the Sum (S) and Difference (D) beams.

The typical active aperture array architecture in the receive mode can error correct only in the Sum or Difference networks and it cannot correct both networks simultaneously. Further, the typical architecture must be of a high operational precision, thereby also being difficult to manufacture.

It is well known that Sum (S) and Difference (D) illuminations are interchangeable with a steered pair of fixed contiguous beams as for example, in the standard monopulse radar comparator. However, to date, Sum and Difference illuminations have not been used to eliminate error differences.

Emerging active aperture systems require low sidelobe, monopulse capability when the radar system is in the receive mode. A pattern of a typical monopulse beam set, transmitting at 3.00 GHz has for example, 36 elements spaced apart 7.0561 cm (2.7780 inches) with a Sum efficiency of −1.33 dB and a Difference efficiency of −3.15 dB. Utilizing the phase of the Sum beam as a reference we define zero degrees of phase. The Difference beam has two main lobes on either side of the Sum beam peak. One lobe has a pattern phase of zero degrees and the other lobe has a phase of 180 degrees. The improved angular resolution with a monopulse beam set is obtained by the Sum Difference ratio. The amplitude and phase illumination functions for this typical beam set would have a Sum illumination of 0 degrees and a Difference illumination phase which is antisymmetric with one-half being set to 90 degrees and the other half set to −90 degrees. The Sum and the Difference illumination tapers are in phase quadrature. Further, there would be very little correspondence between the two illumination functions.

The problem to be solved then, is to provide a high precision error compensation system that can error correct both the Sum and Difference beams simultaneously, and to design an array architecture capable of forming a monopulse beam set which does not rely on complex beamforming networks.

It is desirable to design a beamforming architecture for a monopulse active array incorporating a commonalty in the manifolding, where a single set of amplitude and phase adjustments in the Transmit/Receive modules steer the beams and compensate for errors in the Sum and Difference manifolds.

SUMMARY OF THE INVENTION

An architecture for monopulse, active aperture arrays having; a radiating antenna operable to receive a signal, a transmit-receive module connected to the radiating antenna, a −3.01 dB Wilkinson divider connected to the transmit-receive module whereby the Wilkinson divider can divide in half the output signal received from the transmit-receive module, a Sum plus Difference (S+D) network which is operable to receive one-half of the divided signal, a Sum minus Difference (S−D) network, also operable to receive the other half of the output signal received from the transmit-receive module, and a four port magic tee, wherein the magic tee is operable to: receive a signal from the Sum plus Difference network, receive a signal from the Sum minus Difference network, output an error-compensated Summed signal, or output an error-compensated Difference signal.

BRIEF DESCRIPTION OF THE DRAWINGS

For a better understanding of the invention reference may be had to the preferred embodiment exemplary of the invention, shown in the accompanying drawings, in which.

DESCRIPTION OF THE PREFERRED EMBODIMENTS

Figure 1:
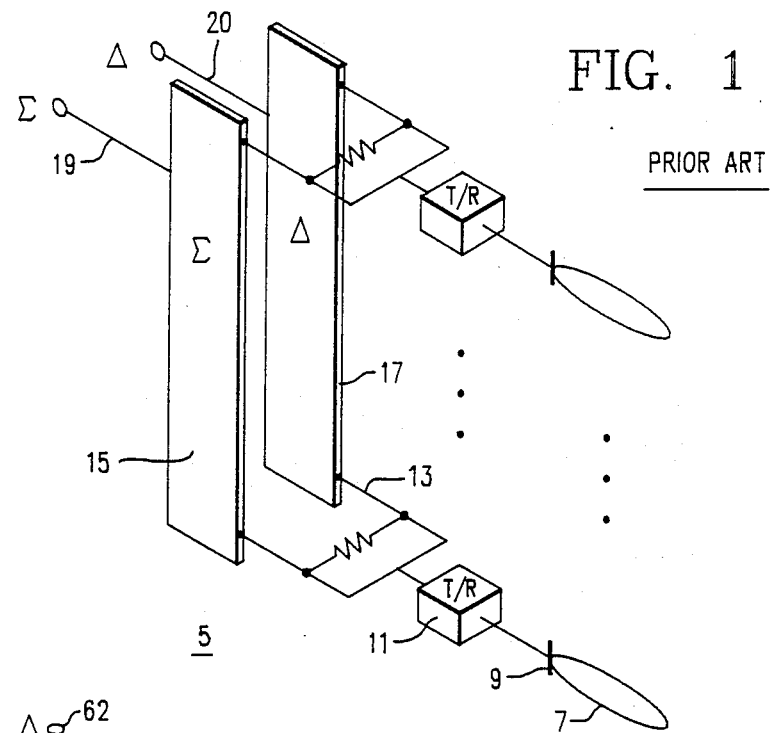
FIG. 1 is a schematic representation of the prior art, a conventional architecture for a monopulse active aperture array, well known in the prior art.

FIG. 1 is a schematic representation of a conventional architecture for a monopulse active aperture array 5, well known in the prior art. The noise figure of the entire array can, to the first order, be assumed to be set after the Low Noise Amplifier in the Transmit/Receive modules 11. Therefore, the effect on the noise figure of splitting the output power past the Transmit/Receive module 11 by −3.01 dB Wilkinson dividers 13 is minimal. Beams 7, whether they are received or emitted, pass through the radiating elements 9. Transmit/Receive modules 11 are interconnected to the radiating elements 9 and send or receive the beams 7. Wilkinson dividers 13 producing a −3.0 dB loss. Sum network beamformer 15, is separate from the Difference network beamformer 17. This separateness between the beamformers 15,17 gives the active aperture array system 5 a monopulse capability. This monopulse active aperture array 5 employs Transmit/Receive modules 11 where there is both amplitude and phase control. The received or emitted beams 7 finally pass from the Difference network beamformer 17 to the Difference output port 20, and the Sum network beamformer 15 to the sum output port 19, respectively.

However, in the monopulse active aperture array 5 in FIG. 1, errors in the beamforming network are not easily calibrated out by means of the Transmit/Receive modules 11.

Further problems with this prior art active aperture array include; the requirement of extremely precise Sum and Difference manifolds to provide low sidelobes on the emitted beam 7, and the impossibility of compensation for both beams with the beam 7 phase and amplitude trimming capabilities within the Transmit/Receive modules 11. Finally, modification of the monopulse active aperture array 5 architecture, incorporating phase and amplitude adjustments with associated monitoring and control circuitry made available to both beamformers 15, 17 would dramatically increase the complexity and cost of the modules, as well as the entire array 5.

Figure 2:
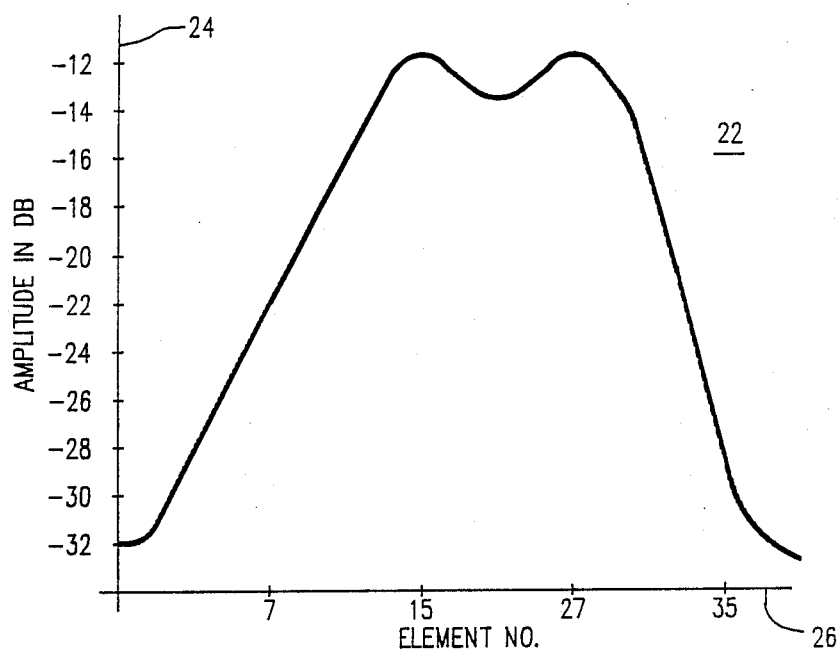
FIG. 2 is a graph of amplitude taper for sum plus difference (S+D) functions.

FIG. 2 is a graph 22 of amplitude taper for Sum Plus Difference (S+D) functions. Both the sum and difference illumination tapers are in phase quadrature. If you consider adding and subtracting the Sum and the Difference illumination tapers two new functions have been created, the Sum Plus Difference beamforming network and the Sum Minus Difference beamforming network. The magnitudes of these two new functions are equal and, the magnitudes and amplitudes of these functions are symmetric about the center of the array. Finally, the Sum Plus Difference network is the complex conjugate of the Sum Minus Difference Network. The graph 22 of amplitude taper for Sum Plus Difference functions has Axis 24, amplitude in dB and ordinate 26 in the number of radiating elements.

Figure 3:
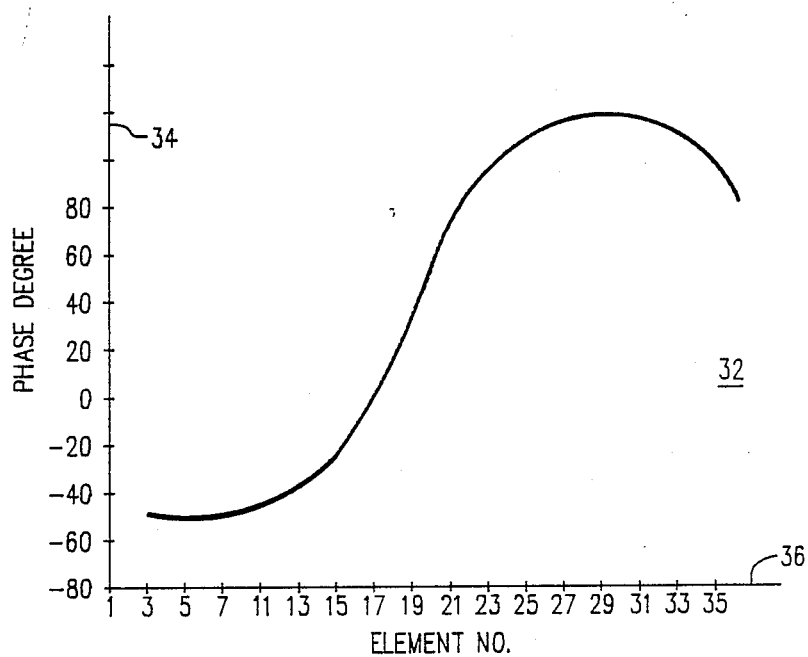
FIG. 3 is a graph of phase taper of beams for sum minus difference (S−D) functions.

FIG. 3 is a graph 32 of phase taper of beams for Sum Minus (S−D) functions. Since the amplitudes of these two new functions are equal and symmetric about the center of the array, the network topology for a corporate network from the input to the output couplers (as more clearly seen in FIG. 4,) is identical for these two networks and totally symmetric about the center line. The single dissimilarity between these two networks is the phase front at the radiating elements. Since the Sum Plus Difference network is the complex conjugate of the Sum Minus Difference network, then the Sum Plus Difference network is the equivalent to the Sum Minus Difference network with the exception that it is physically flipped about the center element. The graph 32 of phase taper beams for Sum Minus functions has the axis 34 in degrees and the ordinate 36 the number of elements.

Figure 4:
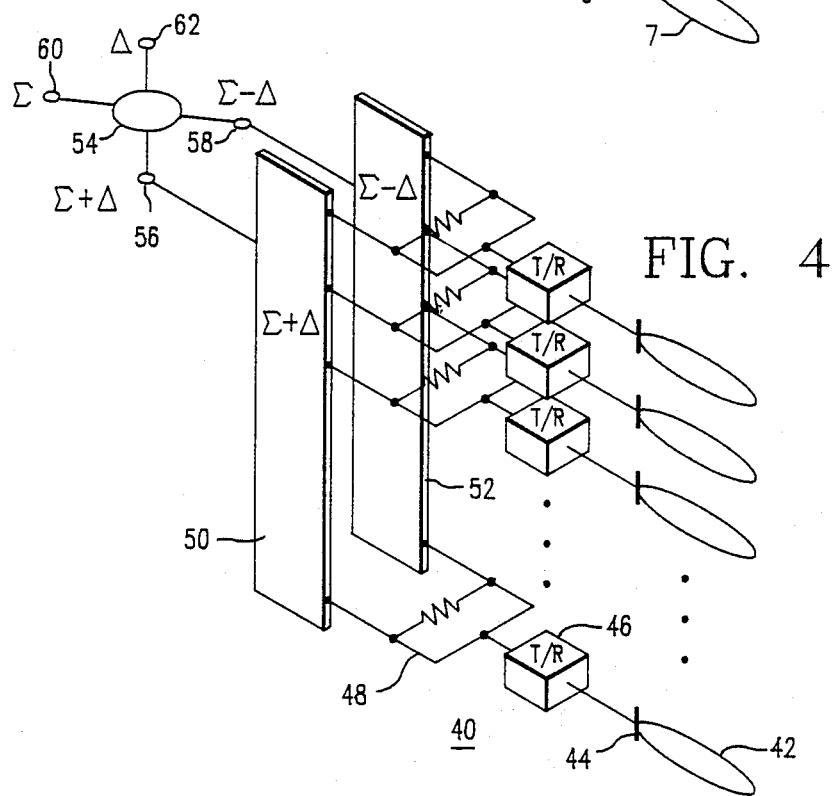
FIG. 4 is a schematic representation of the preferred embodiment, an architecture for monopulse active aperture arrays.

FIG. 4 is a schematic representation of the preferred embodiment, an architecture 40 for monopulse active aperture arrays. In this preferred embodiment a single set of adjustments in the Transmit/Receive modules 46 can compensate for errors in both the Sum and Difference Beams 42. This architecture exploits the properties of the Sum Plus Difference and the Sum Minus Difference functions, described above. The receiving radar elements 44 receive a beam 42. The Transmit/Receive modules 46 are interconnected to the radiating elements 44. The multiplicity of −3.0 dB Wilkinson dividers 48 are interconnected to the Transmit/Receive modules 46. The −3.0 dB Wilkinson dividers 48 are operable to split in half the received beams 42. Also, since the −3.0 dB Wilkinson dividers 48 are symmetric, they are manufactured with extreme precision. The Sum Plus Difference beam-forming network 50 is interconnected to the Wilkinson dividers 48 and receives one-half of the beam 42. The Sum Minus Difference beamforming network 52 receives the other one-half of the beam 42. The interconnection between the Wilkinson dividers 48 and the Sum Plus Difference 50 and Sum Minus Difference 52 networks, using current connectors at S-band, have a phase tolerance of 0.6 degrees rms. If a higher degree of precision is required to produce, for example, lower sidelobe levels, more precise connectors must be developed. Due to the nature of the Sum Plus Difference 50 and Sum Minus Difference 52 networks their errors will be symmetric. Therefore, identical errors are found at the same points of the Sum Plus Difference 50 and Sum Minus Difference 52 networks, and these errors can be compensated for in the Transmit/Receive modules 46. In order to form the desired Sum and Difference beams 42, the outputs of the Sum Plus Difference 50 and Sum Minus Difference 52 networks are fed into the magic tee 54 operable to receive the signals from the Sum Plus Difference output port 56 and the Sum Minus Difference output port 58 or the Sum output port 60 and the Difference output port 62.

This invention solves the problem of simultaneous error compensation for errors in both the Sum (S) and the Difference (D) networks in a receive beam forming network of a Monopulse Active Aperture Array.

In summary, high precision signal error compensation is achieved through the use of existing manufacturing techniques facilitating the error correction of both radar system Sum and Difference beams.

Numerous variations may be made in the abovedescribed combination and different embodiments of this invention may be made without departing from the spirit thereof. Therefore, it is intended that all matter contained in the foregoing description and in the accompanying drawings shall be interpreted as illustrative and not in a limiting sense.

We claim:

1. An architecture for monopulse, active aperture arrays, comprising:
   at least one radiating antenna means, said radiating antenna means operable to receive or transmit a signal from outside of said monopulse, active aperture array;
   a least one transmit-receive means, said transmit-receive means cooperatively associated with said radiating antenna means, said transmit-receive means operable to receive said signal from said radiating antenna means;
   at least one −3.01 dB Wilkinson divider, said −3.01 Wilkinson divider cooperatively associated with said transmit-receive means, said −3.01 dB Wilkinson divider operable to receive said signal from said transmit-receive means and split said received signal from said transmit-receive means in half;
   a sum plus difference network (S+D), said sum plus difference (S+D) network cooperatively associated with said −3.01 dB Wilkinson divider, said sum plus difference network operable to receive said one-half of said received signal from said −3.01 Wilkinson divider;
   a sum minus difference (S−D) network, said sum minus difference (S−D) network cooperatively associated with said −3.01 Wilkinson divider, said sum minus difference network operable to receive said one-half of said received signal from said −3.01 dB Wilkinson divider; and,
   a four port magic tee, said four port magic tee operable to receive an output signal from said Sum plus Difference network (S+D) and said four port magic tee operable to receive an output signal from said Sum minus Difference (S−D) network, said four port magic tee being further operable to output an error compensated Summed signal or an error compensated Difference signal.

* * * * *